A. B. HUTCHINS.
Seed-Planter.
No. 27,635.
Patented Mar. 27, 1860.
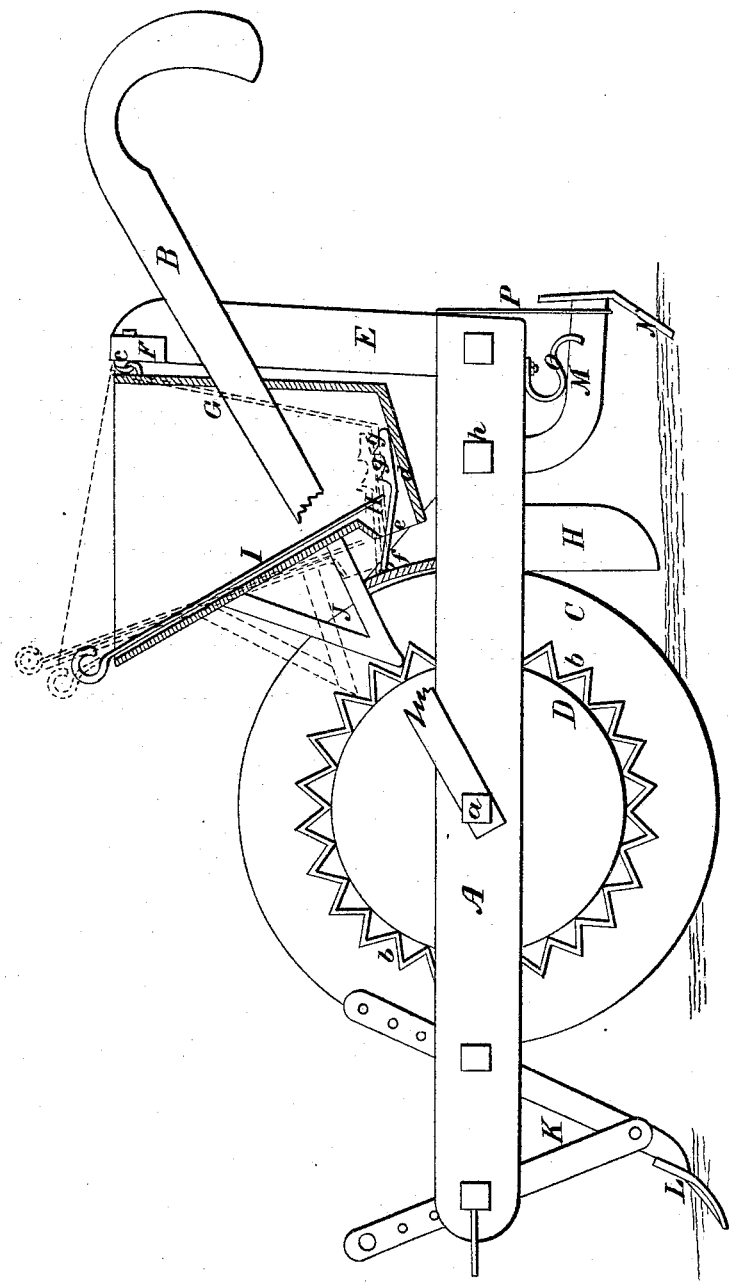
Witnesses:
A. W. Coombs
R. S. Spimer
Inventor:
A. B. Hutchins
per Munn & Co
attorneys

UNITED STATES PATENT OFFICE.

A. B. HUTCHINS, OF QUINCY, FLORIDA.

IMPROVEMENT IN SEEDING-MACHINES.

Specification forming part of Letters Patent No. 27,635, dated March 27, 1860.

*To all whom it may concern:*

Be it known that I, A. B. HUTCHINS, of Quincy, in the county of Gadsden and State of Florida, have invented a new and Improved Seeding-Machine; and I do hereby declare that the following is a full, clear, and exact description of the same, reference being had to the annexed drawing, making a part of this specification, said drawing being a side view of my invention, partly in section.

This invention, although capable of being used for planting various kinds of seeds, is more especially designed for planting cotton-seed.

The object of the invention is to insure the proper discharge or distribution of the seed from the hopper, and thereby obviate the difficulty attending the adhesion or the sticking of the seed together—a result due in some cases to moisture and a glutinous exterior, caused by giving the seed a fertilizing coat, and in other cases to natural causes—as, for instance, the lint coating on cotton-seed.

The invention consists in the employment or use of a vibrating hopper and a clearer arranged in relation with a discharge-tube, substantially as hereinafter described, to effect the desired result.

To enable those skilled in the art to fully understand and construct my invention, I will proceed to describe it.

A represents the draft-beam of the implement, to which suitable handles, B, are attached, similar to plow-handles; and C is a wheel, which is fitted within the beam on an axis, *a*, said wheel being of any suitable diameter, and having a concentric circular projection, D, at one side of it, to the periphery of which V-shaped teeth *b* are attached, as shown clearly in the drawing.

To the back part of the beam A a vertical upright, E, is attached, said upright having a horizontal cross-piece, F, at its upper end, to which a hopper, G, is suspended by hooks or joints *c*. The hopper is allowed to work or swing freely on its hooks or joints *c*, and its lower part terminates in an inclined spout, *d*, the orifice of which is directly over the upper end of a vertical spout, H, which is attached to the beam A, directly behind the wheel C. The front side of the spout H projects above the beam A, and an agitator or clearer, H', is connected thereto. This clearer is formed of a rod, *e*, attached to the front part of the spout by a joint, *f*. The rod *e* passes through the spout *d* into the hopper G, and the back end of said rod is flattened and provided with one or more projections, *g*, extending upward, as shown clearly in the drawing. To the inner surface of the front part of the hopper G a slide, I, is attached, the lower end of said slide extending down within the spout *d*, and by being raised or lowered regulating the capacity of the discharge of the spout as occasion may require.

To the front side of the hopper G a V-shaped arm, J, is attached, the front end of which extends within the path of the movement of the teeth *b* of the projection D of wheel C.

To the front part of the beam A a V-shaped standard, K, is secured, said standard having a furrow-share, L, attached to its lower end.

In the back part of the beam A a curved bar, M, is secured by a bolt or pivot, *h*. The lower part of this bar is about in a horizontal position, and a covering-share, N, is attached to its outer end.

O is a spring, which is secured to the under side of the beam and bears on the bar M, said spring having a tendency to keep the covering-share in contact with the ground.

P is a guide for the bar M.

The operation is as follows: The hopper G is supplied with seed, and as the implement is drawn along a shake motion is given said hopper through the medium of the teeth *b* and the arm J, in connection with the gravity of the hopper. The rod *e*, with its projections *g g*, causes the seed to pass uniformly out through the spout *d* of the hopper into the spout H, the projections *g g* detaching or loosening the seed one from the other. This function of the agitator or clearer depends, of course, on the vibrating movement of the hopper, said movement also causing the seed to settle within it, and effectually preventing the arching of the seed over the clearer. The flow of seed from the spout *d* is regulated by the slide I. The spout H conveys the seed into the furrow made by share L, the share L covering the same.

Having thus described my invention, what I claim as new, and desire to secure by Letters Patent, is—

The vibrating hopper G, in connection with the agitator or clearer H', attached to the front part of the spout H, and passing within the hopper, the hopper and clearer being arranged relatively with the spout H, substantially as and for the purpose set forth.

A. B. HUTCHINS.

Witnesses:
W. H. SAULS,
D. W. HOLLAMON.